3,600,473
PHOSPHATE ESTER-β-CAROTENE PRECURSORS
Joseph Donald Surmatis, West Caldwell, N.J., assignor to
Hoffmann-La Roche Inc., Nutley, N.J.
No Drawing. Application July 11, 1968, Ser. No. 743,979,
which is a division of application Ser. No. 416,128,
Dec. 4, 1964. Divided and this application July 16,
1970, Ser. No. 55,583
Int. Cl. C07f 9/40
U.S. Cl. 260—956            2 Claims

ABSTRACT OF THE DISCLOSURE

The compound diethyl 9-[2,6,6-trimethyl-1-cyclohexen-1-yl]-3,7-dimethyl-2,6,8-nonatrien-4-yne phosphonate, and its dehydrogenated products which are intermediates in the preparation of trans-β-carotene from oxenin or isooxenin.

RELATED APPLICATIONS

This application is a divisional application of Ser. No. 743,979, filed July 11, 1968, which in turn is a divisional application of Ser. No. 416,128, filed Dec. 4, 1964, now U.S. Pat. No. 3,408,414.

DETAILED DESCRIPTION

The process of producing trans-β-carotene from oxenin or isooxenin by the process of this invention is carried out according to the following reaction scheme:

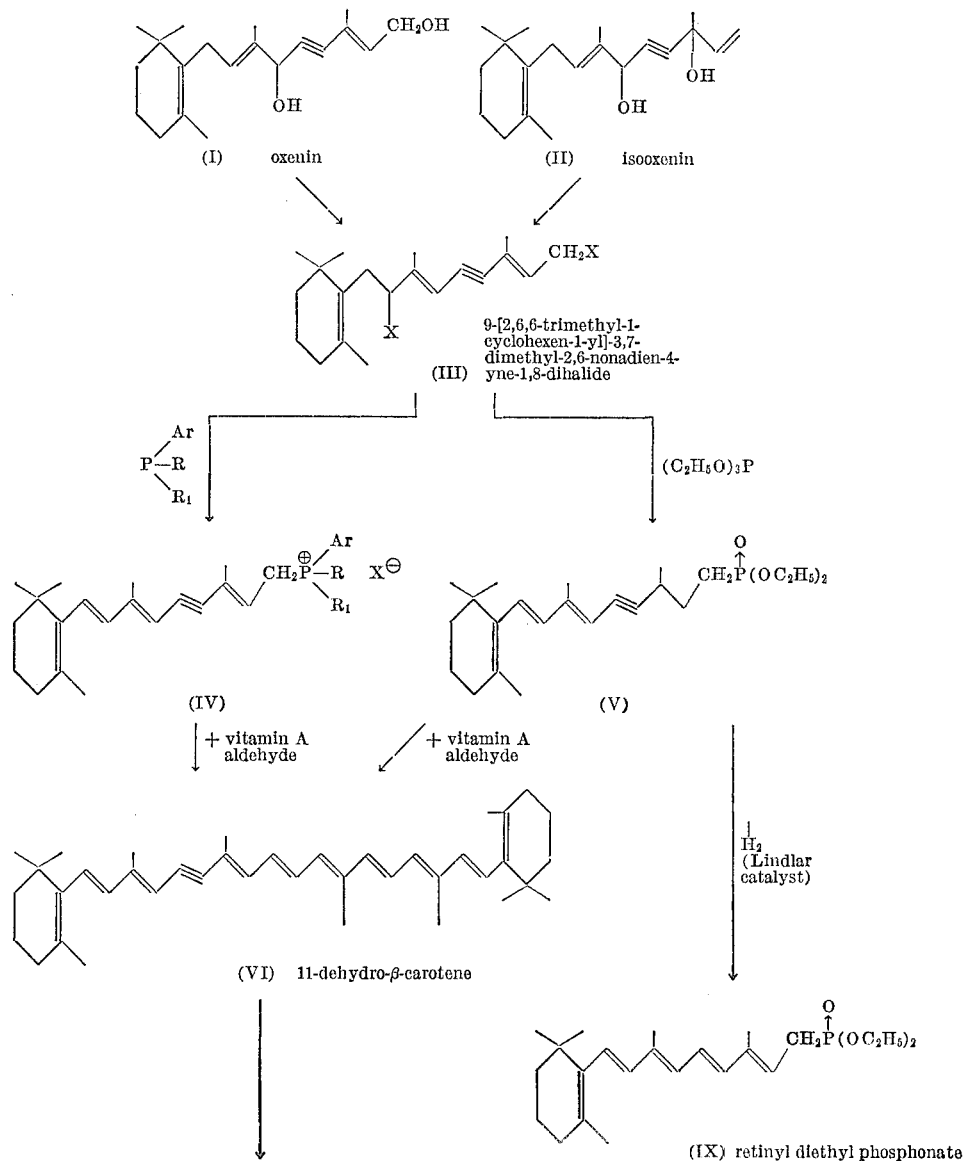

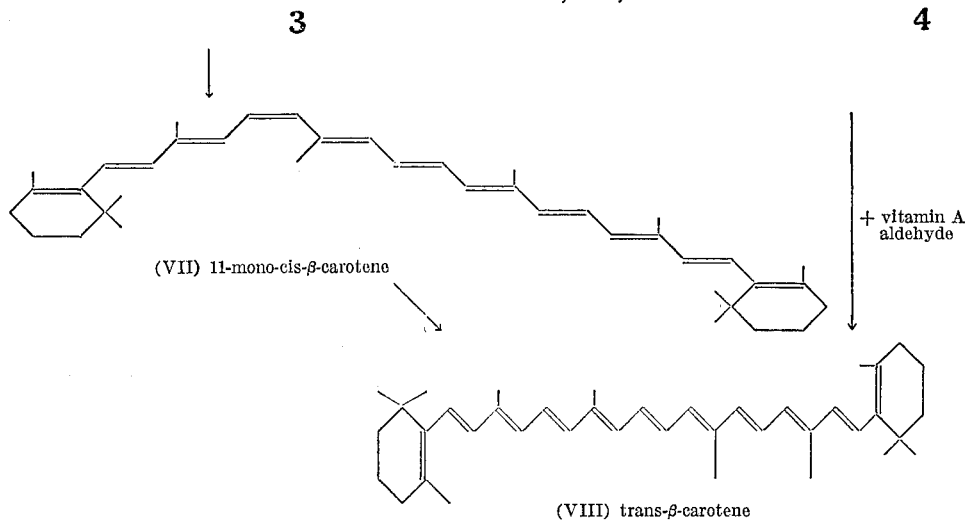

In the above flowsheet X is chlorine or bromine, Ar is an aryl radical, e.g., phenyl, mono- or dihydroxy-substituted phenyl, or mono- or di-lower alkyl-substituted phenyl, e.g., tolyl, xylyl, etc., and R and $R_1$ are Ar or higher alkyl, i.e., straight or branched chain alkyl having 8 or more carbon atoms.

In the above reaction scheme oxenin (9-[2,6,6-trimethyl-1-cyclohexen-1-yl]-3,7-dimethyl - 2,7 - nonadien-4-yne-1,6-diol) (I) is reacted with a phosphorus trihalide, i.e., phosphorus tribromide or phosphorus trichloride, to give 9-[2,6,6-trimethyl-1-cyclohexen-1-yl]-3,7-dimethyl-2,6-nonadien-4-yne-1,8-dihalide (III). Alternatively, isooxenin (9-[2,6,6-trimethyl - 1 - cyclohexen-1-yl]-3,7-dimethyl-1,7-nonadien-4-yne-3,6-diol) (II) when reacted with phosphorus trihalide also forms compound (III). The above reactions with phosphorus trihalide are preferably carried out in an inert organic solvent, e.g., a hydrocarbon solvent, such as petroleum ether.

The above dihalide (III) can then be condensed with a phosphine of the formula:

wherein Ar is an aromatic hydrocarbon radical, e.g., phenyl, mono- or di-lower alkyl-substituted phenyl, such as tolyl, xylyl, etc., mono- or dihydroxy phenyl, etc., and R and $R_1$ can be Ar groups or can be higher aliphatic hydrocarbon groups, i.e., straight or branched chain alkyl groups having at least 8 carbon atoms.

Triphenyl-phosphine is preferred for use in the instant process. This reaction produces a compound of Formula IV.

The compound of Formula IV is then reacted with vitamin A aldehyde, preferably in an inert solvent, e.g., an aliphatic hydrocarbon solvent, benzene, etc., or an ether, e.g., tetrahydrofuran, or in pyridine, the latter being the preferred solvent for use in the practice of the invention, to form 11-dehydro-β-carotene (VI). The reaction is carried out in the presence of an alkali metal lower alkoxide, e.g., sodium methoxide. 11-dehydro-β-carotene (VI) is then hydrogenated in the presence of a palladium catalyst poisoned with lead [see, e.g., H. Lindlar, Helv. Chim. Acta, 35, 446 (1952)], preferably in an inert solvent, e.g., an aliphatic hydrocarbon solvent, to form 11-mono-cis-β-carotene (VII).

11-mono-cis-β-carotene is isomerized to trans-β-carotene (VIII) by heating, e.g., at a temperature in the range of from about 90° to about 95° for from about 10 to about 20 hours.

Alternatively, compound (III) above can be reacted with triethoxy phosphite to form a phosphonate derivative of Formula V. Compound (V) is then reacted with vitamin A aldehyde under the same conditions given above for compound (IV) to form 11-dehydro-β-carotene (VI).

Alternatively, compound (V) can be hydrogenated with a Lindlar catalyst, under the same conditions employed to hydrogenate 11-dehydro-β-carotene (VI) to 11-mono-cis-β-carotene (VII). Retinyl diethyl phosphonate (IX) is formed thereby. Retinyl diethyl phosphonate is then reacted with vitamin A aldehyde, under the same conditions employed above with compound (IV), to yield trans-β-carotene (VIII).

Isooxenin (II) is a novel compound which is obtained by reacting 3-hydroxy-3-methyl-penten-1-yne-4 with methyl magnesium bromide to form the corresponding Grignard compound, and then reacting the latter with 4-(2,6,6-trimethyl-cyclohexen-1-yl)-2-methyl - 2 - buten-1-al. The resulting reaction product is decomposed, e.g., with water containing ammonium chloride, acetic acid, or a dilute mineral acid, e.g., HCl, $H_2SO_4$, etc., to yield isooxenin.

The invention will be better understood by reference to the following examples which are given for illustration purposes only and are not meant to limit the invention.

EXAMPLE 1

Preparation of 9-[2,6,6-trimethyl-1-cyclohexen-1-yl]-3,7-dimethyl-2,6-nonadien-4-yne-1,8-halide Oxenin (9-[2,6,6-trimethyl - 1 - cyclohexen-1-yl]-3,7-dimethyl-2,7-nonadien-4-yne-1,6-diol) (400 g.) was placed in a five-liter flask with 2000 ml. of ethyl ether and 5 ml. of pyridine. Phosphorus tribromide (128 ml.) was dissolved in petroleum ether (800 ml.) and added to the stirred reaction at —5° over three hours. The reaction mixture was poured onto crushed ice in a separator, and the ether layer containing the product was separated. This was washed with water, saturated sodium bicarbonate solution, and finally with water. After drying over anhydrous sodium sulfate, the solvent was removed under vacuum, with a temperature not exceeding 30°. The product, 9-[2,6,6-trimethyl - 1 - cyclohexen-1-yl]-3,7-dimethyl-2,6-nonadien-4-yne-1,8-halide, which was obtained as a dark orange colored syrup, weighed 497 g. and the ultraviolet adsorption had a maximum at 287 mμ (in ethanol).

EXAMPLE 2

Preparation of triphenyl-9-[2,6,6-trimethyl-1-cyclohexen-1-yl]-3,7-dimethyl - 2,6,8-nonatrien-4-yne phosphonium bromide 140 g. of 9-[2,6,6-trimethyl-1-cyclohexen-1-yl]-3,7-dimethyl-2,6-nonadien-4-yne-1,8-halide, 1000 ml. of tetrahydrofuran, and 167 g. of triphenyl-phosphine were placed in a two-liter flask and stirred under an atmosphere of nitrogen for 48 hours. The ultraviolet adsorption spectrum was determined on a sample of the reaction mixture and was found to have a maximum at 330 mμ. This was used for the next step without further purification.

EXAMPLE 3

Preparation of 11-dehydro-β-carotene

A methanol solution of sodium methoxide (prepared by dissolving 16 g. of sodium in 500 ml. of methyl alcohol) and a second solution consisting of 77 g. of vitamin A aldehyde dissolved in 500 ml. of methyl alcohol, were charged to separate dropping funnels and added at the same time to the reaction product from Example 2. The addition required one hour. The stirring was then continued for an additional two hours under an atmosphere of nitrogen. The reaction mixture was placed in a separator with one liter of water and extracted with methylene chloride. On removal of the solvent under vacuum, the product consisted of crude 11-dehydro-β-carotene. The ultraviolet spectrum showed the main adsorption maximum at 427 mμ with an inflection at 455 mμ (in cyclohexane). After purification from methylene chloride-methanol, the product was obtained as an orange colored crystalline solid with $E_{1\ cm.}^{1\%}$ 1800 at 427 mμ (in cyclohexane)

EXAMPLE 4

Preparation of 11-mono-cis-β-carotene

A solution of 11-dehydro-β-carotene prepared according to Example 3 (10 g.) in n-heptane (200 ml.) was hydrogenated in the presence of 0.5 g. of a lead poisoned palladium catalyst prepared by adding 3.5 parts of lead acetate to 41 parts of palladium chloride precipitated on calcium carbonate (5% palladium chloride) until a one molar equivalent of hydrogen was consumed. The catalyst was filtered off under an atmosphere of nitrogen, and washed with additional n-heptane. On removal of the solvent, the product consisted of crude 11-mono-cis-β-carotene with ultraviolet adsorption maxima at 335, 454, and 480 mμ.

EXAMPLE 5

Preparation of trans-β-carotene

The 11-mono-cis-β-carotene prepared according to Example 4 was placed in a flash with 20 ml. of heptane and stirred under an inert atmosphere for 20 hours at 95° C. This caused the cis-carotene to isomerize to the trans form which began to crystallize from the hot heptane. The reaction was cooled to room temperature, filtered, and the product on the filter, which consisted of almost pure trans-β-carotene, was washed with additional heptane and dried under vacuum. The product has $E_{1\ cm.}^{1\%}$ 2219 at 454 mμ

On recrystallization from methylene chloride, pure trans-β-carotene was obtained with $E_{1\ cm.}^{1\%}$ 2450 at 454 mμ (in cyclohexane)

EXAMPLE 6

Preparation of diethyl 9-[2,6,6-trimethyl-1-cyclohexen-1-yl]-3,7-dimethyl-2,6,8-nonatrien-4-yne phosphonate 214 g. of 9-[2,6,6-trimethyl-1-cyclohexen-1-yl]-3,7-dimethyl-2,6-nonadien-4-yne-1,8-halide prepared according to Example 1, was placed in a flask with 166 g. of triethyl phosphite. The flask was fitted with a condenser for distillation and the contents were slowly heated to 140° over a period of two hours. Most of the reaction took place between 120–140°, while a distillate which was rich in ethyl bromide was collected. The heating was then continued for an additional hour allowing the temperature to rise to 150°.

The lower boiling impurities were removed under vacuum by heating to 120° at 10 mm. There was obtained 216 g. of crude diethyl-9-[2,6,6-trimethyl-1-cyclohexen-1-yl]-3,7-dimethyl-2,6,8 - nonatrien-4-yne phosphonate with $n_D^{25}$ 1.5612. A pure analytical sample was prepared by distillation through a molecular still. This had a boiling point of 110° at 10 microns with $n_D^{25}$ 1.5644. The ultraviolet adsorption spectrum had a maximum at 318 mμ (in ethyl alcohol).

EXAMPLE 7

Preparation of 11-dehydro-β-carotene 8 g. of diethyl 9-[2,6,6-trimethyl-1-cyclohexen-1-yl]-3,7-dimethyl-2,6,8-nonatrien-4-yne phosphonate prepared according to Example 6, was dissolved in 100 ml. of tetrahydrofuran. Vitamin A aldehyde (5 g.) and solid sodium methoxide (1.5 g.) were added in the order named. The reaction was stirred under an atmosphere of nitrogen for four hours.

The reaction mixture was diluted with 200 ml. of water and extracted with methylene chloride. After removal of the methylene chloride, the product consisted of 11-dehydro-β-carotene (which was also obtained by Example 3). The product, after purification from methylene chloride and methyl alcohol, was obtained as an orange colored crystalline solid with $E_{1\ cm.}^{1\%}$ 1850 at 427 mμ

EXAMPLE 8

Preparation of 9-[2,6,6-trimethyl-1-cyclohexen-1-yl]-3,7-dimethyl-2,7-nonadien-4-yne-1,6-diol One mole of ethyl magnesium bromide in 500 ml. of ethyl ether was prepared by the usual Grignard procedure in a two-liter round-bottom flask. 3-hydroxy-3-methylpenten-1-yne-4 (48 g.) was placed in a separatory funnel with an equal volume of ethyl ether and added to the Grignard reagent over a period of two hours. After stirring for an additional 10 minutes, 103 g. of $C_{14}$ aldehyde (4-[2,6,6-trimethylcyclohexen - 1 - yl]-2-methyl-2-buten-1-al) was charged to the separatory funnel and added while stirring vigorously in one hour. After all of the aldehyde was added, the reaction flask was warmed externally to cause the ether to reflux while stirring for two additional hours.

The reaction was decomposed with water and most of the resulting grey precipitate was dissolved in 5% sulfuric acid. The ether layer was separated and water washed. On removal of the ether solvent, a white crystalline mass was obtained. To this there was added 200 ml. of petroleum ether. The solid mass was broken up, and the petroleum ether was heated to reflux while stirring. The solubility of the isooxenin was such that most of it remained undissolved. This was cooled overnight in a refrigerator and filtered. There was obtained 121 g. of dried isooxenin, melting point 102°.

EXAMPLE 9

Preparation of 9-[2,6,6-trimethyl-1-cyclohexen-1-yl-]-3,7-dimethyl-2,6-nonadien-4-yne-1,8-halide 33 g. of isooxenin which was prepared according to Example 8, was placed in a flask with 200 ml. of ethyl ether and 4 drops of pyridine. Phosphorus tribromide (11 ml.) was dissolved in 50 ml. of hexane and dropped into the stirred reaction at −5° in one hour. The reaction mixture was poured onto crushed ice in a separator. The ether layer was separated, washed with water, saturated sodium bicarbonate solution, and finally with water. The solution was dried over anhydrous sodium sulfate, and the solvent was removed under vacuum. The product was obtained as an orange colored syrup, with the violet adsorption maximum at 287 mμ (in ethanol). This product, 9-[2,6,6-trimethyl-1-cyclohexen-1-yl] - 3,7 - dimethyl-2,6-nonadien-4-yne-1,8-halide, was identical with the compound prepared according to Example 1.

EXAMPLE 10

Preparation of retinyl diethyl phosphonate

A solution of diethyl 9-[2,6,6-trimethyl-1-cyclohexen-1-yl]-3,7-dimethyl-2,6,8-nonatrien-4-yne phosphonate (12 g.) in toluene (240 ml.) was hydrogenated in the presence of poisoned palladium catalyst [H. Lindlar, Helv. Chim. Acta, 35, 446 (1952)] until a one molar equivalent of hydrogen was consumed. The catalyst was filtered off and washed with toluene. Upon removal of the solvent under vacuum, the product, which was retinyl diethyl phosphonate, was obtained as an orange colored syrup with $n_D^{25}$ 1.555. This was employed in the next step without further purification.

EXAMPLE 11

Preparation of trans-β-carotene

Retinyl diethyl phosphonate (10 g.), vitamin A aldehyde (7 g.) and sodium methoxide (1.5 g.) were added to 100 ml. of tetrahydrofuran in the order named and the reaction was stirred under an atmosphere of nitrogen for four hours The resulting dark red solution was poured into water and extracted with methylene chloride. On removal of the solvent, the residue consisted of a mixture of trans and 11-mono-cis-β-carotene.

The crude carotene mixture was placed in a flask with 20 ml. of heptane and refluxed for 20 hours under an atmosphere of nitrogen. This was cooled, diluted with additional heptane and filtered to give almost pure trans-β-carotene in high yield. On recrystallization from methylene chloride, pure trans-β-carotene was obtained, melting point 182°, $E_{1cm.}^{1\%}$ (454 mμ) 2450 (in cyclohexane)

I claim:
1. Diethyl 9-[2,6,6-trimethyl-1-cyclohexen-1-yl]-3,7-dimethyl-2,6,8-nonatrien-4-yne phosphonate.
2. Retinyl diethyl phosphonate.

References Cited

UNITED STATES PATENTS 2,671,106  3/1954  Albisetti et al. _____ 260—956

OTHER REFERENCES

Von Schwieter et al.: Helv. Chim. Acta., 49 (1966), pp. 369–389.

CHARLES B. PARKER, Primary Examiner

R. L. RAYMOND, Assistant Examiner

U.S. Cl. X.R.

260—606.5, 617, 648, 666